United States Patent
Köhle et al.

(10) Patent No.: US 10,462,447 B1
(45) Date of Patent: Oct. 29, 2019

(54) ELECTRONIC SYSTEM INCLUDING IMAGE PROCESSING UNIT FOR RECONSTRUCTING 3D SURFACES AND ITERATIVE TRIANGULATION METHOD

(71) Applicant: Sony Corporation, Tokyo (JP)

(72) Inventors: Roderick Köhle, Munich (DE);
Francesco Michielin, Stuttgart (DE);
Dennis Harres, Stuttgart (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/456,612

(22) Filed: Jun. 28, 2019

(30) Foreign Application Priority Data

Dec. 14, 2015 (EP) ..................................... 15199839

(51) Int. Cl.
| | | |
|---|---|---|
| *G06K 9/00* | (2006.01) | |
| *H04N 13/128* | (2018.01) | |
| *H04N 13/204* | (2018.01) | |
| *H04N 13/239* | (2018.01) | |
| *H04N 13/00* | (2018.01) | |

(52) U.S. Cl.
CPC ......... *H04N 13/128* (2018.05); *H04N 13/204* (2018.05); *H04N 13/239* (2018.05); *H04N 2013/0081* (2013.01)

(58) Field of Classification Search
CPC .. H04N 13/128; H04N 13/239; H04N 13/204; H04N 2013/0081
See application file for complete search history.

(56) References Cited

U.S. PATENT DOCUMENTS

| | | |
|---|---|---|
| 7,023,432 B2 | 4/2006 | Fletcher et al. |
| 7,466,314 B2 | 12/2008 | Loop et al. |
| 2011/0007081 A1* | 1/2011 | Gordon ................... G06T 7/246 345/475 |
| 2011/0164810 A1* | 7/2011 | Zang ....................... G06T 17/00 382/154 |
| 2012/0056800 A1* | 3/2012 | Williams ................ G06F 3/011 345/156 |
| 2012/0194516 A1 | 8/2012 | Newcombe et al. |
| 2012/0194644 A1 | 8/2012 | Newcombe et al. |
| 2012/0195471 A1 | 8/2012 | Newcombe et al. |
| 2014/0078258 A1 | 3/2014 | Chandraker et al. |
| 2014/0363073 A1 | 12/2014 | Shirakyan et al. |

(Continued)

FOREIGN PATENT DOCUMENTS

| | | |
|---|---|---|
| EP | 1039417 B1 | 12/2006 |
| WO | 2014/128498 A2 | 8/2014 |

OTHER PUBLICATIONS

Geiger, Andreas "StereoScan: Dense 3d Reconstruction in Real-time", 2011 IEEE intelligent vehicles symposium, conference date: Jun. 5-9, 2011, Baden-Baden, Germany, pp. 963-968.

(Continued)

*Primary Examiner* — Samir A Ahmed
(74) *Attorney, Agent, or Firm* — Xsensus LLP

(57) ABSTRACT

An electronic system includes a circuitry configured to obtain a sequence of frames of an object under different viewing angles at consecutive time instances. For a first time instance, the circuitry generates a point cloud descriptive for an external surface of the object on basis of (i) a point cloud obtained for a second time instance preceding the first time instance and (ii) disparity information concerning a frame captured at the first time instance.

12 Claims, 11 Drawing Sheets

(56) References Cited

U.S. PATENT DOCUMENTS

| | | |
|---|---|---|
| 2015/0142248 A1 | 5/2015 | Han et al. |
| 2015/0199816 A1 | 7/2015 | Freeman et al. |
| 2015/0363665 A1* | 12/2015 | Szasz .................. G06K 9/52 382/203 |
| 2016/0203371 A1 | 7/2016 | Tyagi et al. |
| 2017/0094259 A1* | 3/2017 | Kouperman ......... H04N 13/111 |

OTHER PUBLICATIONS

Newcombe, Richard "Live Dense Reconstruction with a Single Moving Camera", 2010 IEEE computer Society Conference on Computer Vision and Pattern Recognition, Jun. 13-18, 2010, San Francisco, CA, USA, pp. 1498-1505.

Ning Xu, et al., "Iterative 3D Surface Modelling From a Sparse Set of Matched Feature Points", IEEE, 2002, 4 pgs.

Pablo F. Alcantarilla, et al., "Large-Scale Dense 3D Reconstruction from Stereo Imagery", IEEE, 2013, 7 pgs.

Petri Tanskanen et al., "Live Metric 3D Reconstruction on Mobile Phones", IEEE, 2013, 8 pgs.

Sid Yingze Bao, et al., "Dense Object Reconstruction with Semantic Priors", IEEE, 2013, 8 pgs.

Xiaoyan Hu, et al., "Least Commitment, Viewpoint-based, Multi-view Stereo", Anonymous 3DIMPVT submission Paper ID 35, IEEE, 2012, 9 pgs.

Zen Chen, et al., "3D Robust Reconstruction using A Hand-Held Digital Camera", IEEE, 2015, 2 pgs.

\* cited by examiner

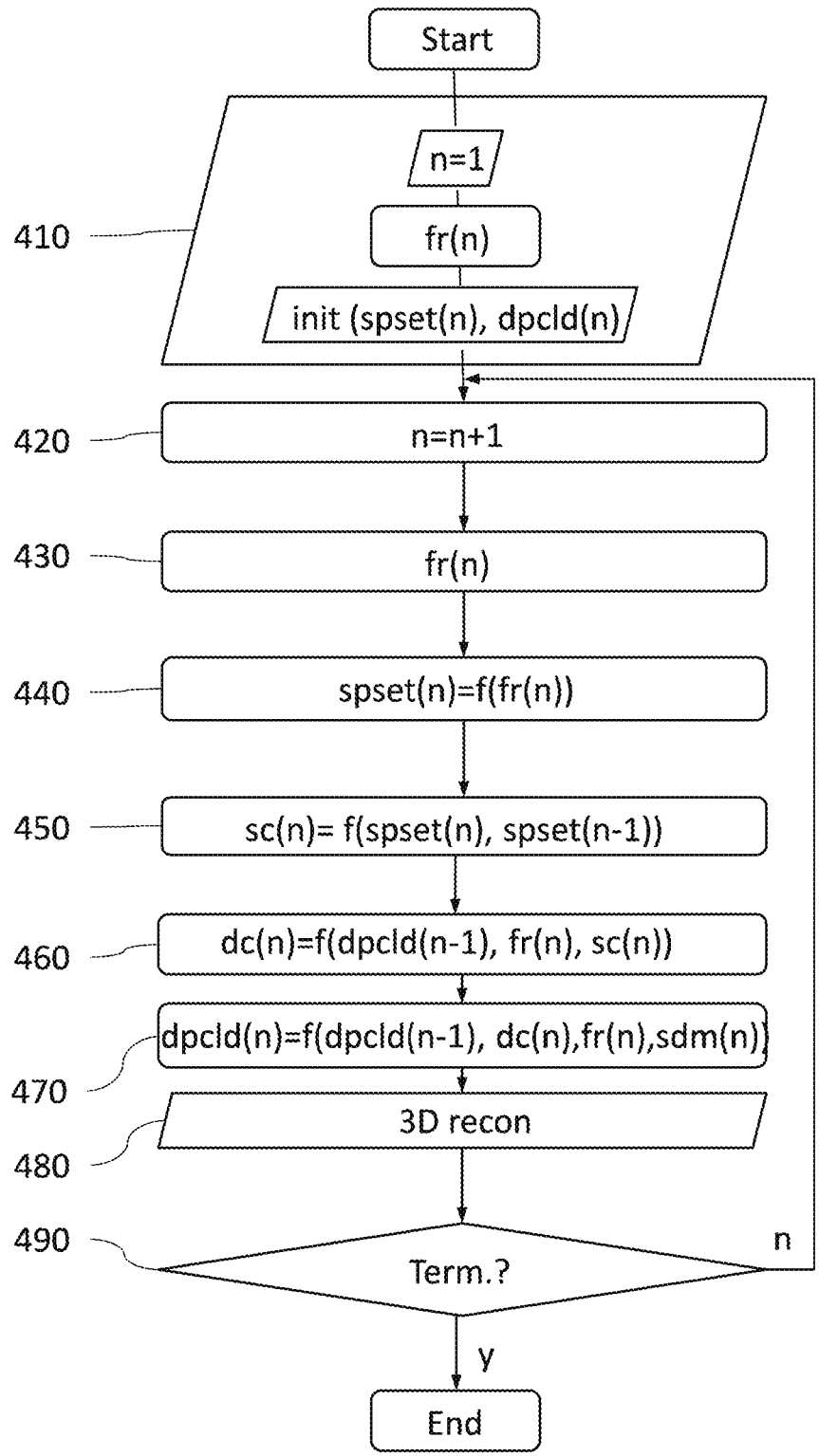

(1)

ELECTRONIC SYSTEM INCLUDING IMAGE PROCESSING UNIT FOR RECONSTRUCTING 3D SURFACES AND ITERATIVE TRIANGULATION METHOD

CROSS-REFERENCE TO RELATED APPLICATIONS

This application is a continuation of U.S. application Ser. No. 15/370,688, Dec. 6, 2016, and claims priority to EP 15199839.0, filed Dec. 14, 2015, the entire contents of each are incorporated herein by reference.

BACKGROUND

Field of the Disclosure

The embodiments relate to methods and electronic systems for reconstructing 3D surfaces of objects from a sequence of captured frames.

Description of Related Art 3D reconstruction techniques capture a plurality of image frames under different viewing angles, calculate a dense point cloud descriptive for a 3D surface of an object of interest and generate a 3D visualization of the object in a 2D plane. Typical offline approaches reconstruct the 3D surface by tracking and saving all image points of all image frames. Even known iterative approaches typically save all image points of all image frames or at least some of them for a global pose optimization.

There is a need for electric appliances rendering 3D information and recovering a dense 3D surface description of an object of interest in a convenient and economic way. The object of the present embodiments is achieved by subject-matter of the independent claims. The dependent claims define further embodiments.

SUMMARY

According to an embodiment, an electronic system includes a circuitry configured to capture a sequence of frames imaging an object under different viewing angles at consecutive time instances and to generate, for a first time instance, a dense point cloud descriptive for an external surface of the object on basis of (i) a dense point cloud obtained for a second time instance preceding the first time instance and (ii) disparity information concerning a frame captured at the first time instance.

According to another embodiment, a 3D reconstruction method includes capturing a sequence of frames of an object under different viewing angles at consecutive time instances. For a first time instance, a point cloud is generated that is descriptive for an external surface of the object on basis of (i) a dense point cloud obtained for a second time instance preceding the first time instance and (ii) disparity information concerning a frame captured at the first time instance.

According to a further embodiment, an iterative triangulation method includes converting 3D information for image points in frames captured from different positions into a ray representation containing direction information and updating the ray representation with each newly captured frame.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings.

FIG. 1C is a schematic diagram showing a mode of operation of the electronic system of FIG. 1A according to an embodiment.

DESCRIPTION OF THE EMBODIMENTS

Figure 1A:
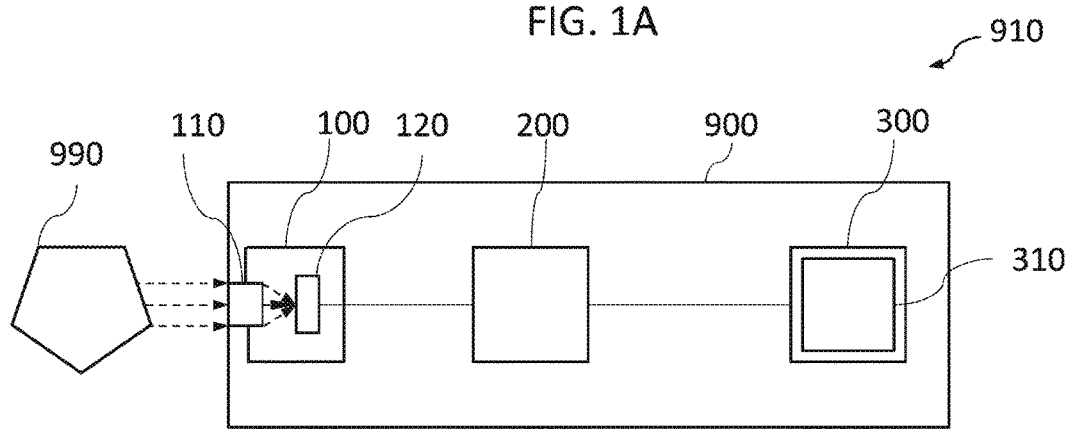
FIG. 1A is a schematic block diagram of an electronic system according to an embodiment.

In the following drawings, like reference numerals designate identical or corresponding parts throughout the several views. The elements of the drawings are not necessarily to scale relative to each other. Features of the illustrated embodiments can be combined with each other to perform yet further embodiments.

FIG. 1A shows an electronic system 900, which may be or which may include a device moveable along or around an object 990 of interest, which is in focus of a following 3D reconstruction. The electronic system 900 may be or may include a device moved by handcraft, e.g., a handheld or wearable device. For example, the electronic system 900 may be or may include a smart phone, a tablet, a camera, a personal digital assistant or a smart watch. Alternatively, the electronic system 900 may be a moveable part of a diagnostic apparatus. According to another embodiment, the electronic system 900 is mounted in a stationary apparatus along which the object 990 passes, e.g., on a conveyor belt.

The electronic system 900 includes a circuitry (910) with an image capturing unit 100 that includes an optical system 110, which may be a monocular system or a binocular system and which images light emitted or reflected from the object 990 onto an imaging unit 120. The imaging unit 120 can be any device suitable for capturing images by converting light into electric signals. For example, the imaging unit 120 may be a CCD (charge coupled device) or an active pixel sensor including a CMOS (complementary metal oxide semiconductor) camera. The electronic system 900 or at least the image capturing unit 100 is movable relative to the object 990 or vice versa, wherein the image capturing unit 100 captures a plurality of image frames of the object 990 under different viewing angles at different time instances.

A processing unit 200 of the electronic system 900 may exclusively process the frames captured by the image capturing unit 100 or may also control further sub-units of the electronic system 900. The processing unit 200 and the image capturing unit 100 are connected through a data transmission path transmitting the captured frames. The circuitry 910 may be integrated in one housing or may be distributed in spatially separated housings.

For each time instance, after initialization the processing unit 200 generates a dense point cloud descriptive for an external 3D surface of the object 990 in an iterative process using a preceding dense point cloud obtained for a second time instance directly preceding a first, current time instance as well as disparity information concerning a current frame captured at the current time instance. The dense point cloud assigns depth information to image points recorded during capture of the sequence of frames, wherein the depth information represents the distance of a point on the surface of the object 990 to a reference point, which may be any virtual point in space, e.g., a focal point, a starting position or a current position of the image capturing unit 100 of the electronic system 900. In other words, the dense point cloud is a collection of 3D coordinates of points on an external surface of the object 990. A representation of the dense point cloud may be a depth map that assigns a depth value to each or some of the image points of a 2D image array. The dense point cloud descriptive for the object 990 contains a number of image points equivalent to the number of pixels of the imaging unit in a section of a pixel area onto which the object 990 is imaged.

According to an embodiment, the processing unit 200 may use sparse disparity information derived from the current frame and the directly preceding frame for determining a dense correspondence map that identifies correspondences in the preceding dense point cloud and the current frame. According to another embodiment, the processing unit 200 may use sparse disparity information derived from different sub-frames captured at the same time instance from different viewing angles, e.g., from the two sub-frames of a current stereoscopic frame.

Correspondences are corresponding or "matching" image points in two different frames or point clouds that image the same surface point of the object 990. Identifying correspondences in two frames captured from different viewing positions typically is an iterative optimization task that requires the more computational effort the more image points (pixels) the frames include. Instead, the processing unit 200 at first solves the correspondence problem for a small subset of the available image points only and then uses the preceding dense point cloud and disparity information of the selected image points in the current and the preceding frame for the search for dense correspondences.

By using, for each iteration, the preceding dense point cloud as starting value and the current sparse correspondences the iterative task needs only few optimization cycles and significantly less computational effort for achieving a satisfying match than other methods.

For corresponding image points in the current frame and the preceding dense point cloud, the processing unit 200 updates the depth information contained in the preceding dense point cloud on the basis of the additional disparity information contained in the current frame and outputs an updated dense point cloud containing additional depth information from the current frame.

In other words, the processing unit 200 performs an iterative process updating previously obtained depth information successively with each newly captured frame and uses only operations that compare or combine, e.g., not more than two dense point clouds with each other.

As a consequence, the processing unit 200 needs to temporarily store not more than two dense point clouds at the same point in time in a working memory such that the 3D reconstruction according to the embodiments drastically reduces memory requirements compared to approaches saving all image points of all image frames.

In case the frame is a single image captured by a monocular camera, the shape of the object 990 can be recovered up to scale, i.e., true to scale but without precise information on the absolute dimensions. In case the frame includes a set of sub frames corresponding to images obtained by a camera array, e.g., a stereo or tri-ocular camera, both the shape and the scale, i.e., precise information on the absolute dimensions of the object 990 may be recovered.

In addition, since the approach gets along without combining more than two dense fields of image points with each other, the computational load is comparatively low and allows in-situ visual reproduction of the re-constructed object in real time, e.g., on a screen 310 of a display unit 300 that may be connected to the processing unit 200 through a data path transmitting the dense point cloud information. For example, the image capturing unit 100 and the display unit 300 may be integrated in the same housing, e.g., in a handheld device.

According to embodiments related to handheld devices integrating a display unit 300, the re-constructed object can be displayed in real time on the screen 310 while the electronic system 900 is moved along the object or vice versa such that the user has a continuous visual feedback and can observe a continuous update of the reconstructed 3D representation of the object 990 on the screen 310. A visualization of the reconstructed 3D representation may be a dense 3D point cloud, a dense surface mesh or any other 3D representation that allows the user to steadily check the current result of the scanning process.

Though the image capturing unit 100 may also be a stereoscopic one, or may use more than two independent optical systems, the process may get along with a monoscopic image capturing unit 100 as well. Since overall computational load is low compared to existing approaches, the process provides immediate visual feedback without any data communication with remote devices, e.g., a cloud server. The present approach uniquely combines high update rates for 3D visualization, low power consumption of the electronic system 900 and comparatively high quality of 3D reconstruction.

Figure 1B:
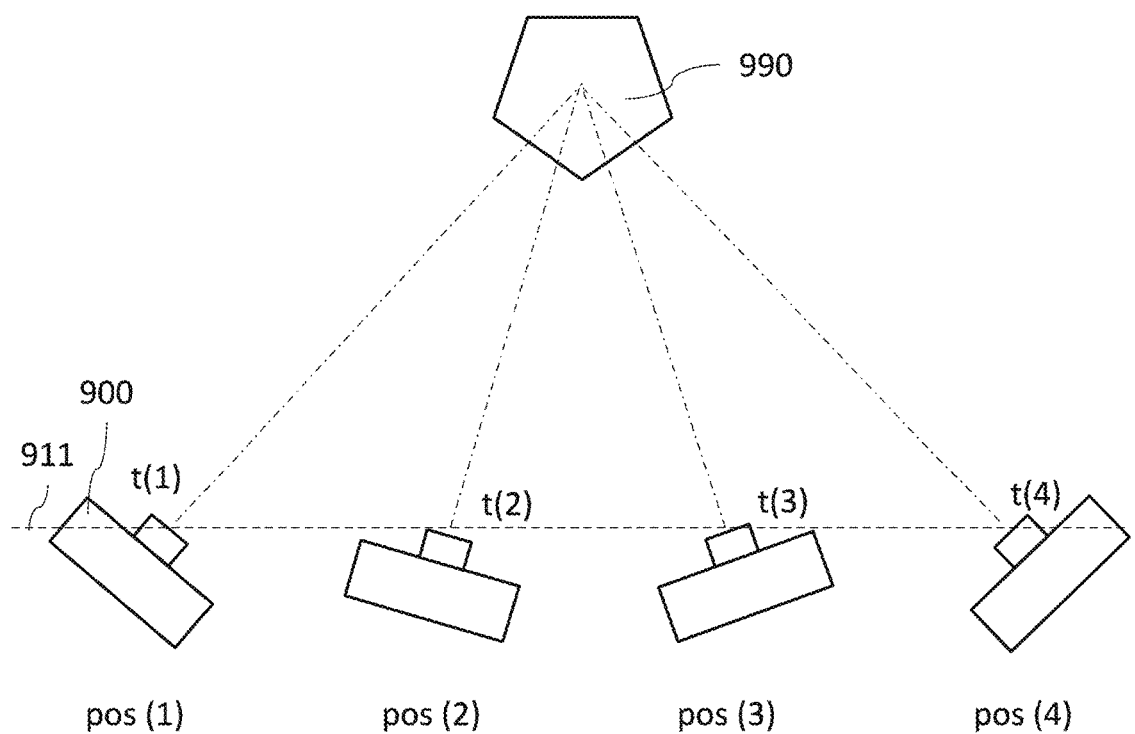
FIG. 1B is a schematic diagram showing a relative movement between the electronic system of FIG. 1A and an object of interest during capturing of a sequence of frames.

FIG. 1B shows a trajectory 911 of the electronic system 900 passing the object. The trajectory 911 is planar or approximately planar, e.g., straight, approximately straight, bowed, or a segment of a circle around the object 990.

At consecutive time instances t(1), t(2), . . . t(n) the electronic system 900 captures frames representing views of the object 990 from different, arbitrary positions pos(1), pos(2), . . . pos(n) on the trajectory 911 under different viewing angles. Intervals between successive time instances t(n) may be arbitrary or may be approximately equal. Distances between neighboring positions pos(n) may be arbitrary or may be approximately equal. Each reconstruction is based on a sequence of frames fr(n) from n=1 to n=nmax, with nmax≥1.

In case a frame consists of a single monocular image, a minimum number of 2 frames with a sufficient change in position are required in order to retrieve meaningful shape information (nmax≥2). In case of stereo or multi-ocular frame capture, e.g. stereo frames, a single frame is the required minimum (nmax≥1). In order to reduce noise and being able to filter out outliers a larger number of frames with translational motion will typically be used. There is no explicit upper limit imposed by the algorithm, but typically after sufficient coverage of the object by the user, there will be no noticeable improvement of the geometry and the accuracy of the 3D reconstruction is theoretically limited by imaging quality and resolution of the used camera system and practically limited by the quality accepted by the user.

The schematic flow chart of FIG. 1C illustrates a 3D reconstruction method performed by the processing unit 200 of the electronic system 900 of FIG. 1A and using temporal matching. An initialization step 410 may set a frame counter n equal to a starting value, e.g., equal to 1, and may initialize a dense point cloud dpcld(n) representing a dense 3D representation of an object 990 as well as a sparse set of salient image points spset(n). Salient image points in a frame are typically image salient features of the 3D surface of the object. Salient features may be, for example, narrow picture areas of high contrast, e.g., corners or edges. The sparse set of salient image points spset(n) identifies a true subset of the available pixel coordinates and contains significantly less image points than the dense point cloud dpcld(n), e.g., at most 5%, or at most 1% of the image points of the corresponding dense point cloud dpcld(n).

In case the image capturing unit 100 is based on binocular optics, dpcld(n)) may be initialized by information based on triangulation of two stereoscopic images captured at the same time instance, e.g., at n=1. In case the image capturing unit 100 is based on monocular optics, initial values of dpcld(n) and spset(n) may be obtained by triangulation from the initial frame fr(1) and another frame fr(n) captured at another time instance from a different viewing position pos(n).

Since for the monocular case no scale information is available, the initial set of 3D points is known only up to scale, i.e. the initial set of 3D points is true to scale but does not contain information on absolute dimensions. In case of stereo imaging using a calibrated stereo camera with known distance between the two lens systems, the scale of the initial 3D points is provided by the baseline distance of the stereo camera that adds information on the actual scale of the initial 3D points.

After initialization, an incrementation step 420 may increment the frame counter n by one. An image capturing step 430 receives a current frame fr(n). In the current frame (n) a localization step 440 may identify image points assigned to valuable salient features and generates a current sparse set of image points spset(n). By triangulation based on disparity information on corresponding salient image points in spset(n) and spset(n−1), an evaluation step 450 may determine sparse correspondences sc(n) or a sparse depth map sdm(n) based on the disparity information concerning the sparse correspondences sc(n). The sparse correspondences sc(n) define pairs of a first and a second pixel coordinate, the first pixel coordinate identifying an image point of the salient feature on the object surface in the current frame fr(n) and the second pixel coordinate identifying an image point of the same salient feature in the preceding frame fr(n−1).

A dense correspondence matching step 460 uses the information on how the position of salient image points changes from the preceding frame fr(n−1) to the current frame fr(n) for improving dense correspondences estimation, which uses a projection of the preceding dense point cloud dpcld(n−1) as well as the current sparse set of sparse correspondences sc(n) to obtain a starting value for an iterative method of searching for correspondences between image points in the current frame fr(n) and the preceding frame fr(n−1). A triangulation update step 470 updates depth information contained in the preceding dense point cloud dpld(n−1) by adding additional depth information contained in the disparity information in the current frame fr(n), e.g., the sparse depth map sdm(n).

An output step 480 may output the current dense point cloud dpcld(n), which describes the external 3D surface of the object, to a display unit, a storage unit, or an interface unit. A termination step 490 checks whether a termination condition is fulfilled, e.g., whether a user has generated a stop signal or whether or not any further frame has been captured within a predetermined time interval. If no termination condition is fulfilled, the frame counter n is incremented by 1 and the process continues with the image capturing step 430 by capturing a new current frame fr(n) and repeating the following steps 440 to 490 until a termination condition occurs.

The method uses an iterative estimation for the search for dense correspondences, wherein a current estimation result is obtained from the previous estimation result by considering additional disparity information about sparse image points contained in the current frame fr(n).

Figure 2A:
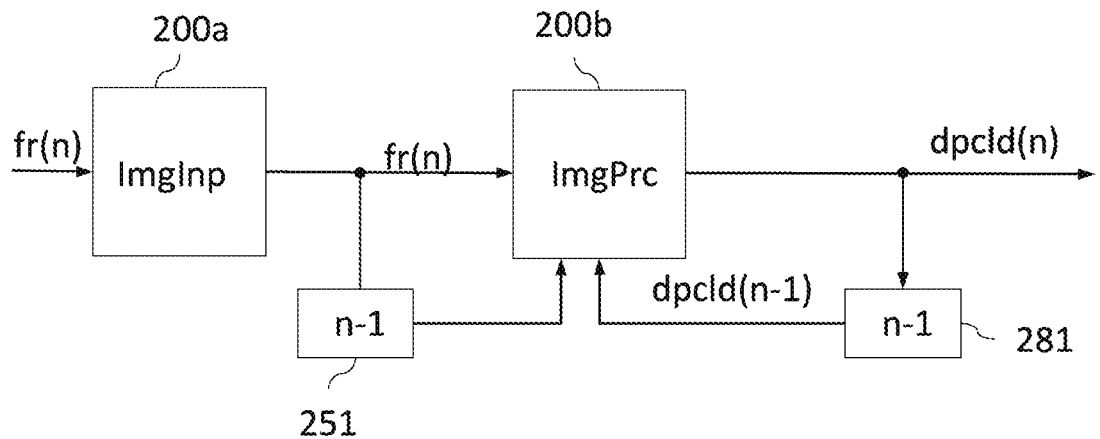
FIG. 2A is a simplified block diagram of a processor unit of the electronic system of FIG. 1A according to an embodiment.

FIG. 2A shows high-level functional building blocks of the processing unit 200 executing the iterative portion of the 3D reconstruction method of FIG. 1C after initialization, wherein each functional building block may be realized in software, e.g., as a set of routines embedded in an operating system and stored in a program memory, as hardware, e.g., as an application specific circuit, or as a combination thereof.

An image input block 200a receives a sequence of frames fr(n) containing image information on images sequentially captured at time instances n, e.g., pixel values for a two-dimensional array of image points, and outputs the frames fr(n) to an image processing block 200b. The image processing block 200b estimates a dense point cloud dpcld(n) for the current time instance n on basis of the previously obtained dense point cloud dpcld(n−1), which may be temporarily stored in a point cloud buffer 281, as well as position information about sparse salient image points in the current frame fr(n) and the preceding frame fr(n−1) or in two or more different sub-frames captured from different positions at the same time instance.

Figure 2B:
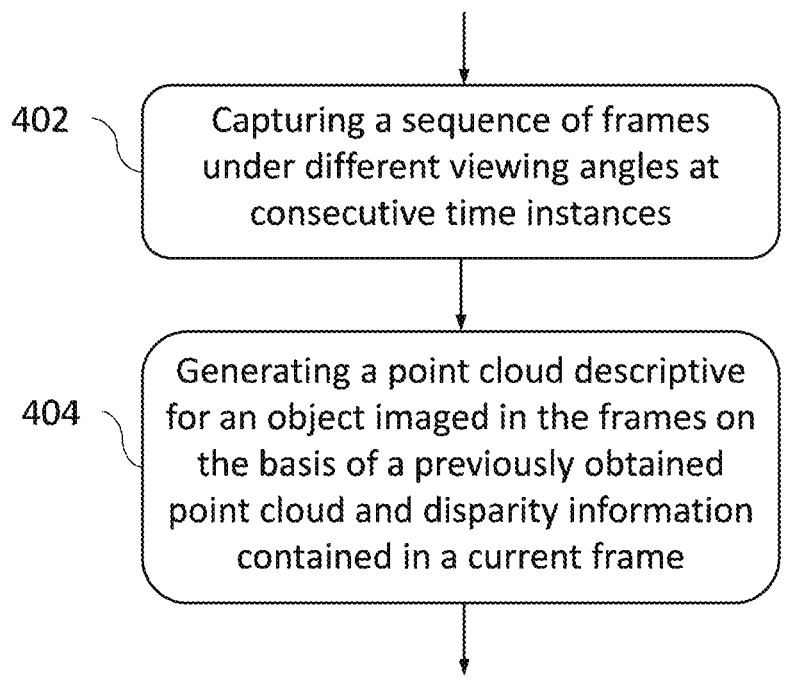
FIG. 2B is a simplified flow chart for a 3D reconstruction method according to another embodiment.

FIG. 2B gives an overview of the reconstruction method that may be performed by the processing unit 200 of FIG. 2A, by way of example. A sequence of frames containing an object of interest is captured under different viewing angles at consecutive time instances (402). For a given time instance, a point cloud descriptive for an external surface of the object is generated by using a point cloud obtained for a time instance preceding the current time instance and disparity information that concerns a frame captured at the current time instance (404). The disparity information may be contained in the frame captured at the current time instance and a directly preceding frame or in sub-frames captured at the same time instance from different viewing positions.

Figure 3A:
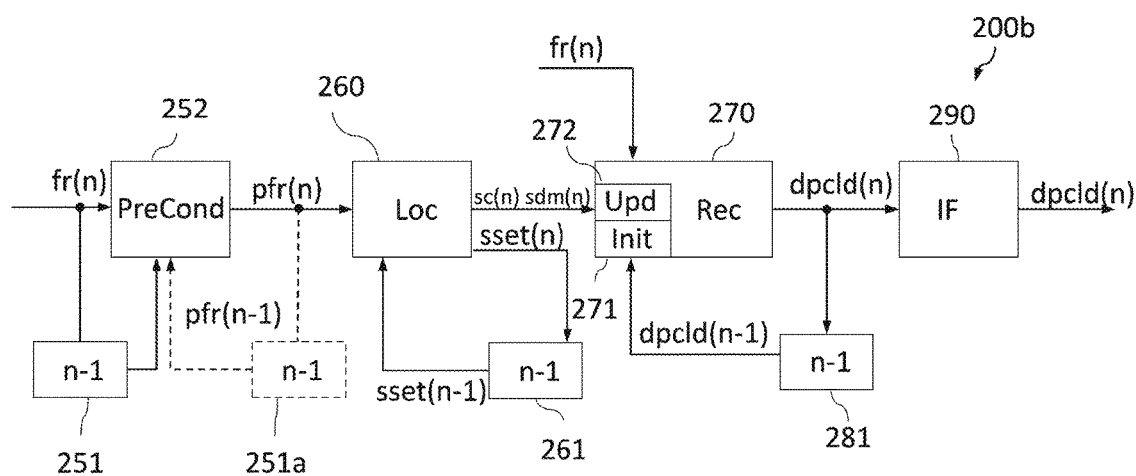
FIG. 3A is a simplified block diagram of an image processing block of the processor unit of FIG. 2 according to an embodiment.
Figure 3B:
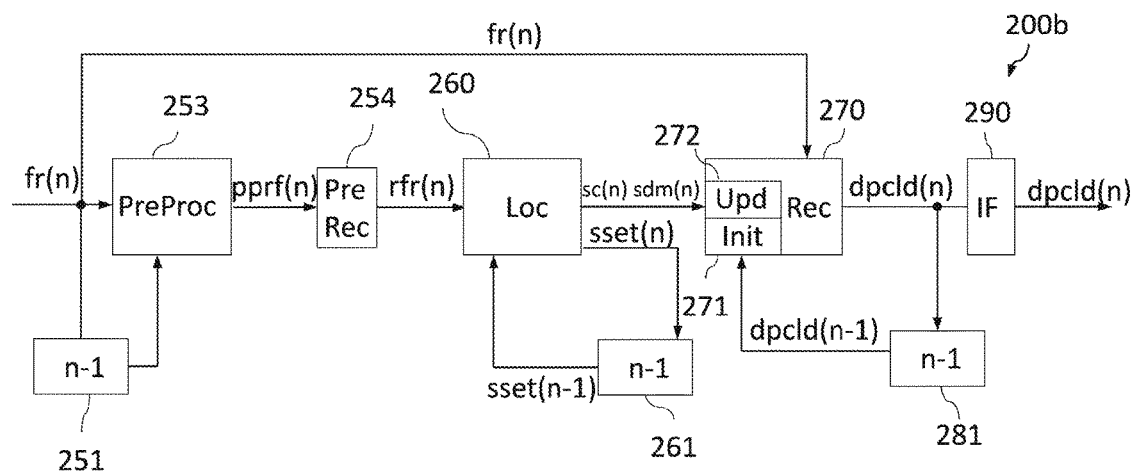
FIG. 3B is a simplified block diagram of an image processing block of the processor unit of FIG. 2 according to an embodiment with a prerectifier block.

FIGS. 3A and 3B show embodiments of the image processing block 200b of FIG. 2 in more detail.

In FIG. 3A a preconditioner block 252 may calibrate, adjust and/or filter the frames fr(n) received from the image input block 200a of FIG. 2 in a way that improves correlation among the frames fr(n) of the same sequence of frames fr(n). To this purpose, the preconditioner block 252 may use the current frame fr(n) as well as a directly preceding frame fr(n−1) temporarily stored in a frame buffer 251 and may generate a preconditioned frame pfr(n) in which orientation, illumination conditions, and/or the size of the image window are more similar to that of the preceding frame fr(n−1) than the original current frame fr(n). Alternatively or in addition the preconditioner block 252 may to some degree compensate imperfections of the optical system.

Alternatively or in addition the preconditioner block 252 may use the previous preconditioned frame pfr(n−1) temporarily stored in a preconditioned frame buffer 251a and may adapt orientation, illumination conditions, and/or the size of the image window of the current frame fr(n) to that of the preceding preconditioned frame pfr(n−1). The preconditioner block 252 may include functional building blocks for color correction, for any type of color filtering, for scaling, contrast enhancement and/or for spatial frequency manipulations such as low-pass filtering and high-pass filtering. The preconditioner block 252 may also compensate for camera lens distortions. For example, the preconditioner block 252 may transform a current frame fr(n) to remove barrel and/or pincushion distortions caused by the optical system 110 of FIG. 1A. The compensation for camera lens distortions may also be applied at a later stage, e.g. may be combined with temporal or epipolar rectification.

From the current preconditioned frame prf(n), a localization block 260 determines sparse pairs of matching salient image points in two consecutive preconditioned frames prf(n), pfr(n−1). Matching salient image points in the two consecutive precondition frames prf(n), pfr(n−1) render the same salient point on the surface of the object 990. The term "sparse" indicates that the number of matching salient image points is significantly lower than the total number of image points in each frame fr(n). For example the portion of matching salient image points is at most 5% or at most 1% of the total number of image points.

From the current sparse set spset(n) and the preceding sparse set spset(n−1) temporarily stored in an auxiliary buffer 261, the localization block 260 may derive sparse correspondences sc(n). The sparse correspondences sc(n) contain information on a displacement of the salient image points from the preceding frame fr(n−1) to the current frame fr(n).

A reconstruction block 270 estimates dense correspondences between the preceding dense point cloud dpcld(n−1) and the current frame fr(n) on the basis of the previously estimated dense point cloud dpcld(n−1) and the sparse correspondences sc(n). The estimation may include a transformation along two orthogonal image axes. An initialization buffer 271 may be initialized with the preceding dense point cloud dpcld(n−1) temporarily stored in a point cloud buffer 281. An update block 272 may apply the information on sparse correspondences sc(n) for the current time instance n onto the preceding dense point cloud dpcld(n−1). An iterative correspondence search results in only slight modification of the updated initialized values to get the dense correspondences. For the identified correspondences, the reconstruction block 270 applies a triangulation to update the depth information in the preceding dense point cloud dpcld(n−1) with the additional depth information gained from the current position pos(n), e.g., from the current frame fr(n) or the sparse depth map sdm(n). Through an interface block 290 the processing unit 200 outputs the updated dense point cloud dpld(n) to another functional building block, to a storage unit, to an interface circuit or to a graphic processor. The reconstruction block 270 may also apply a temporal rectification concerning information derived from different time instances. The temporal rectification determines or tracks the motion of static object points when the imaging unit 120 of FIG. 1A is in motion. The image transformation depends on the pose change, i.e., the transform depends on the motion of the imaging unit 120 of FIG. 1A.

FIG. 3B refers to an embodiment based on a preconditioning of the frames within the preconditioner block 252. A pre-processor block 253 matches the current frames fr(n) to previous frames fr(n−1) as regards colours, image contrast, object size and further image properties. In addition, the pre-processor block 253 may compensate for distortions resulting from an imperfect imaging unit.

A rectification block 254 aligns corresponding horizontal lines in the sub-frames fr(n) of multi-ocular images, e.g. stereo images, to a common base line, which may be defined by the trajectory between two successive positions pos(1) and pos(2) and outputs rectified preconditioned frames rfr (n). In case of stereo rectification, the image transformation is static and its parameters are determined once by calibration of the stereo camera, e.g., by the manufacturer of the stereo camera or by the user in course of a special calibration procedure.

Instead of an epipolar rectification and line correspondence search, an embodiment may alternatively use gradient based optical flow search with epipolar constraints. Alternative to a passive system using stereo camera, an active depth camera such as time of flight, structured light or Helmholtz stereopsis may be used. In this case the stereo rectification and disparity search does not apply, since this functionality is provided by the active depth camera. The temporal matching is still relevant as the system is adapted to track the camera motion to align the 3D information in space.

Since in the rectified frames pfr(n) the epipolar lines will coincide with the image scan lines, the search domain for correspondences in the localization block 260 and the reconstruction block 270 can be reduced from a 2D (two dimensional) problem to a 1D (one dimensional) problem. As a consequence, computational load for the reconstruction block 270 can be significantly reduced. In addition or alternatively to the rectification of the frames, rectification may be performed also at a later stage.

Figure 4A:
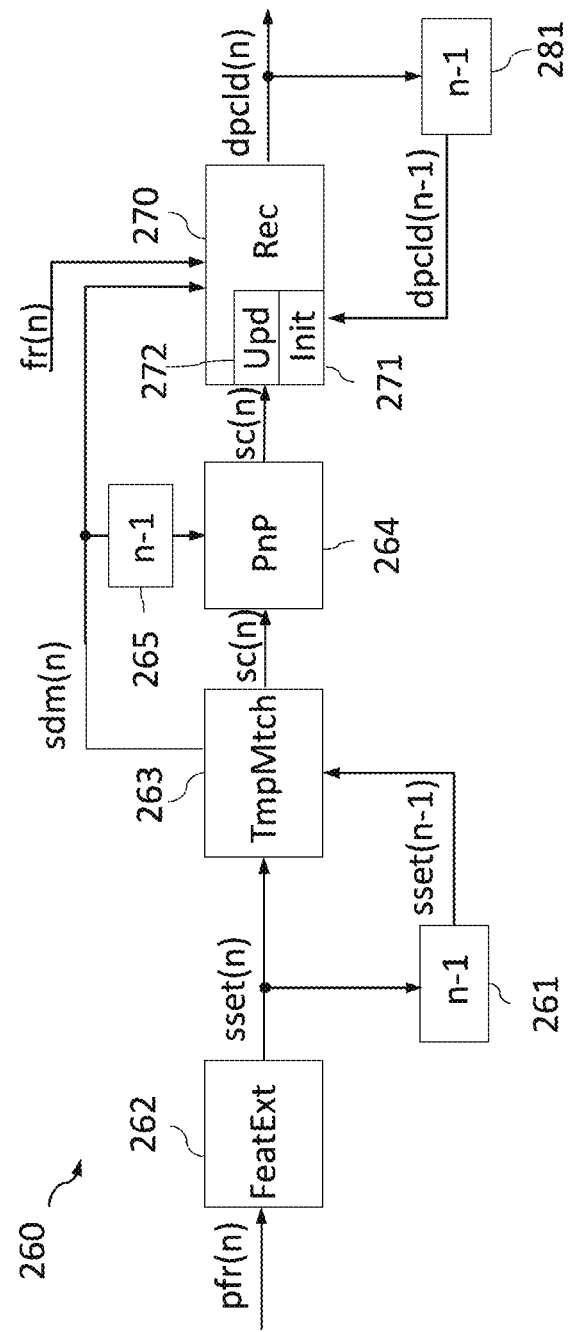
FIG. 4A is a simplified block diagram of a localization block of an image processing block according to an embodiment.

FIG. 4A refers to details of the localization block 260 of FIGS. 3A and 3B. A feature extraction block 262 receives the preconditioned frames pfr(n) and for each preconditioned frame pfr(n) extracts salient image points, wherein the salient image points identify small image areas of high contrast, for example sharp edges and corners. Feature extraction may include a state-of-the-art feature detection block such as FAST (Features from Accelerated Segment Test), SURF (Speeded up Robust Features), or ORB (Oriented FAST and Rotated Binary Robust Independent Elementary Features) to obtain an initial set of salient image points. A sparsification block may reduce the number of salient image points by selecting the most stable salient image points. For example, the sparsification block may virtually move a window across the frame, and selects, for each window position, only a predefined number of valuable salient image points. The sparsification block discards such salient image points that are close to other, more stable salient image points. The sparsification block improves repetitiveness of localization of corresponding salient features among the frames, provides a more distributed information for the pose and position calculation and significantly reduces the number of computations in the following matching blocks. Since usually neighbouring features have similar depth values and most likely belong to the same object, discarding less pronounced salient image points close to pronounced salient points adversely affect the following depth information processing only to a low degree.

A temporal matching block 263 searches for correspondences between the sparse set of salient image points sset(n) and the preceding sparse set of sparse image points sset(n−1) temporarily stored in an auxiliary buffer 261. For example, the temporal matching block 263 obtains an initial set of matches by k-nearest neighbours matching. The temporal matching block 263 may also include a ratio test, and/or a symmetry test, and/or a RANSAC (random sample consensus) method to refine the matches and to remove outliers. The temporal matching block 263 outputs sparse correspondence information sc(n) on correspondences among the sparse sets of salient image points sset(n), sset(n−1).

A pose calculation block 264 receives the sparse correspondence information sc(n) and may use disparity information concerning the sparse correspondences and the preceding sparse depth map sdm(n−1) temporarily stored in an auxiliary buffer 265 to estimate position and pose of the image capturing unit 100 with respect to the previous position and/or with respect to the object. For estimation of position and pose, the pose calculation block 264 may use disparity information about the sparse correspondences between successive frames fr(n), fr(n−1). A RANSAC method may be used to improve stability against outliers. The pose and position information obtained from the sparse correspondences sc(n) may be used to update the previously obtained dense point cloud for obtaining a suitable starting value for the dense correspondences search in the reconstruction block 270.

Figure 4B:
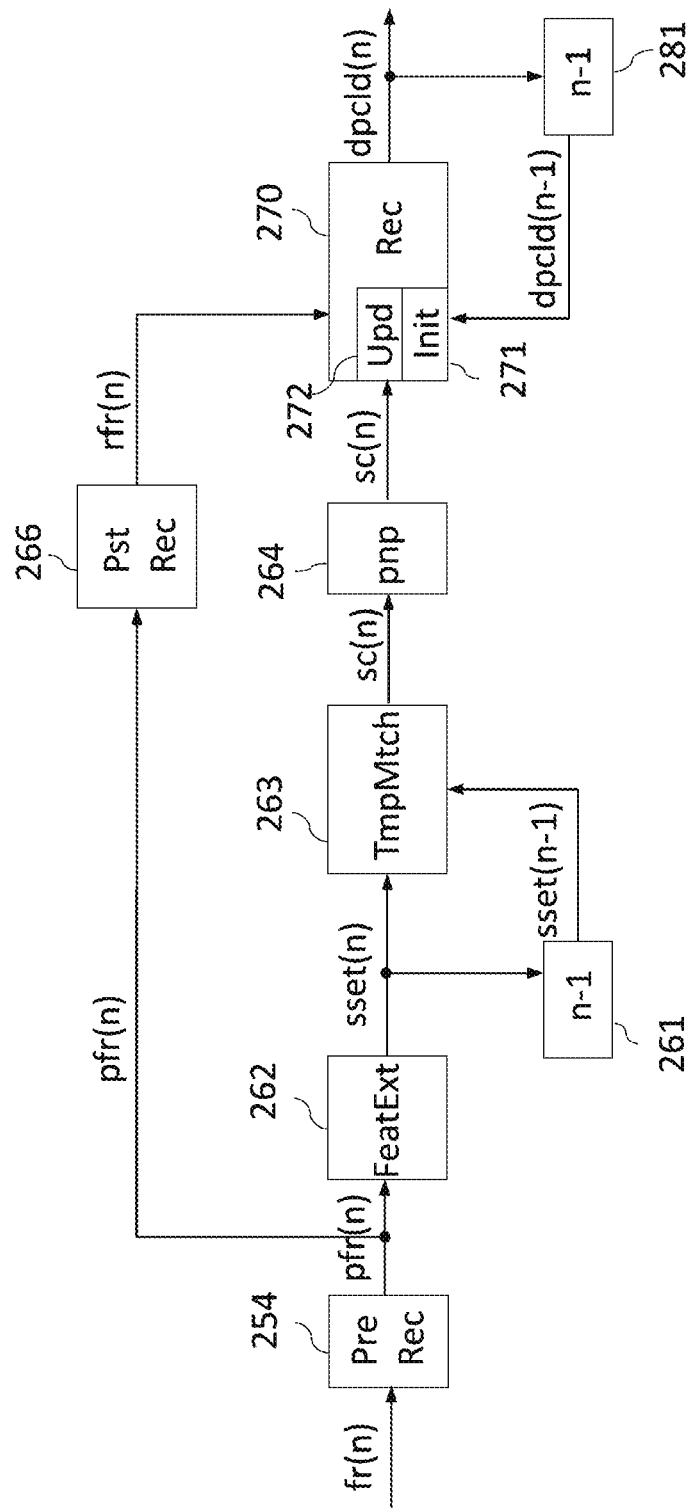
FIG. 4B is a simplified block diagram of a localization block of an image processing block according to an embodiment concerning a post rectification block.

FIG. 4B shows a post rectification block 266 that uses information from the pose and pose calculation block 264 to rectify the preconditioned frames pfr(n) such that the epipolar lines in the two successive point clouds coincide with the image scan lines. In case of rectified images the search domain for correspondences may be reduced to a 1D problem such that the computational complexity for estimating the dense correspondences in the previously obtained point cloud and the current frame fr(n) can be reduced.

Figure 5:
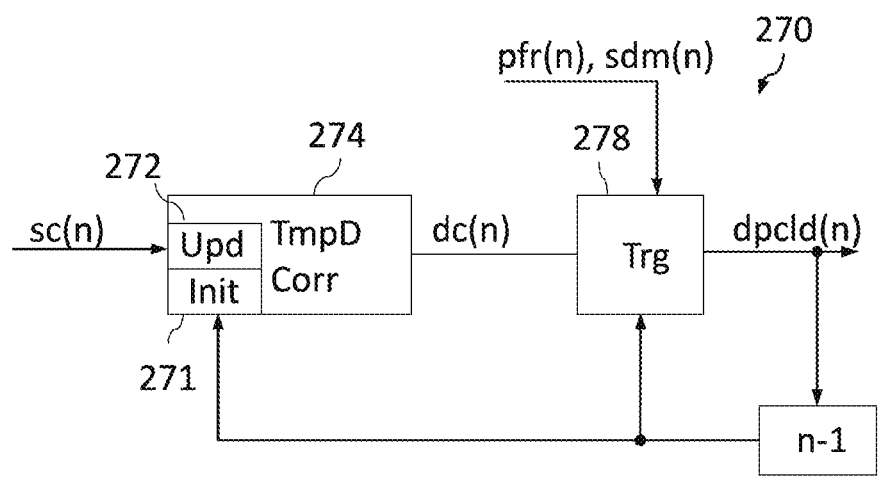
FIG. 5 is a simplified block diagram of a reconstruction block of an image processing block according to an embodiment.

FIG. 5 shows functional building blocks of the reconstruction block 270 according to an embodiment.

The dense correspondences block 274 calculates dense correspondences dc(n) between two consecutive frames either, in absence of the post rectifying block 269, by a local or global optimization in two dimensions, or along one dimension in case of rectified frames. A starting value of the search for dense temporal correspondences may be obtained by the previously obtained dense point cloud dperd(n−1) updated by information obtained about sparse correspondences sc(n).

The triangulation block 278 may use dense temporal correspondences dc(n) to update the depth information in the previous point cloud dpcld(n−1) with the additional information captured in the current frame fr(n) or contained in the sparse depth map sdm(n). According to an embodiment, the triangulation block 278 uses iterative triangulation that updates the previously obtained dense point cloud dpcld(n−1) with the additional depth information contained in the disparity information between the current frame fr(n) and the preceding frame fr(n−1). The triangulation block 278 may use structured light or reciprocal Helmholtz techniques such as Helmholtz stereopsis or an iterative triangulation method using a ray buffer as described below.

Figure 6:
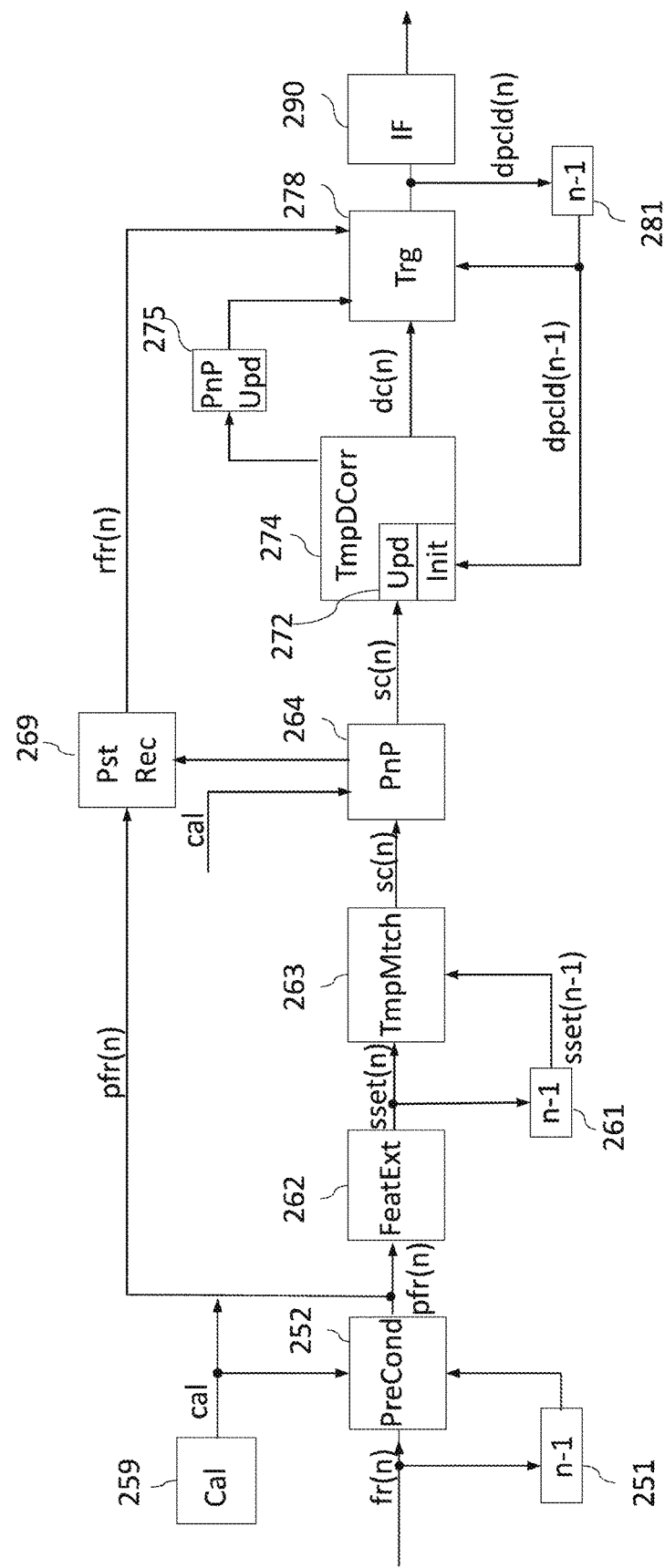
FIG. 6 is a block diagram of an image processing block according to an embodiment referring to a monocular setup.

FIG. 6 shows the functional building blocks of an image processing block 200b as described in the previous figures as well as further details concerning calibration and a pose and position update.

A calibration block 259 may initialize values for the preconditioner block 252 and the pose calculation block 264 with values descriptive for physical qualities of the optical system used for capturing the frames fr(n). Calibration precedes the image capturing and assumes that all frames fr(n) are captured by the same optical system.

The pose calculation block 264 calculates the position of the optical system of the current frame fr(n) on the basis of the calibration data received from the calibration block 259 and on the basis of the 2D-3D correspondences, e.g., the sparse correspondence information sc(n) and/or the preceding sparse depth map information sdm(n−1). The pose and position problem may be solved in an iterative approach with methods such as RANSAC improving the stability against outliers. The optional post rectifying block 269 may apply a rotation function on the current frame fr(n) such that the epipolar lines coincide with the image scan-lines, i.e. the horizontal image lines. With the epipolar lines coinciding with the image scan lines, the dense correspondence problem solved in the reconstruction block 270 is reduced to a 1D problem requiring less computational effort and allowing for faster reconstruction of the 3D surface.

The position update block 275 defines the actual pose on the basis of the dense correspondences dc(n) for the current frame fr(n) using iterative methods. Since these iterative methods average the related noise on the basis of dense correspondences dc(n) instead of the sparse correspondences sc(n) as the pose calculation block 264, the pose estimation is significantly more stable. Compared to conventional approaches for refining the pose and position information on a basis of a bundle adjustment procedure to obtain a global optimum, the position update block 275 gets along with significant less computational effort.

Figure 7:
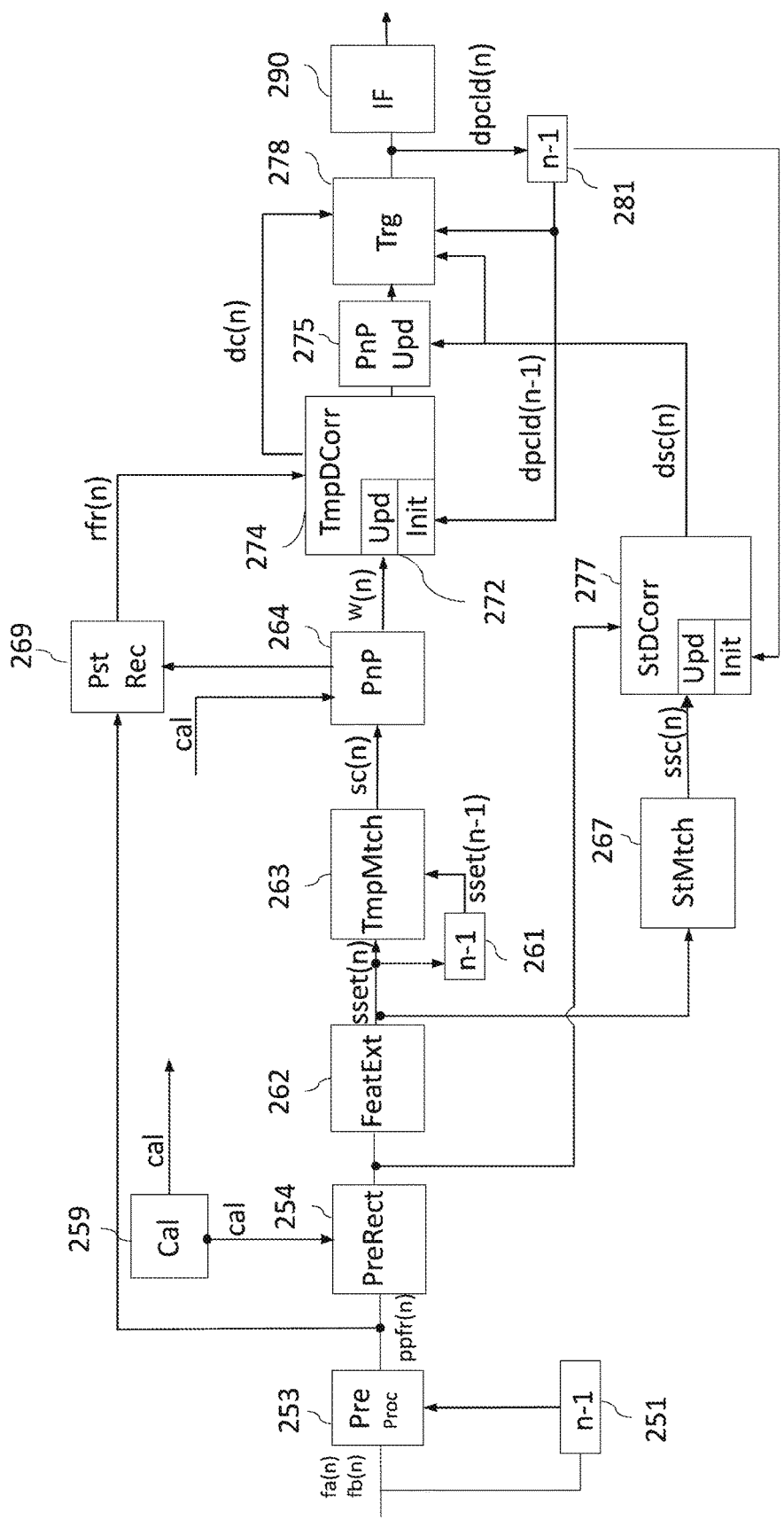
FIG. 7 is a block diagram of an image processing block according to an embodiment referring to a binocular setup.

FIG. 7 shows functional block diagrams of an image processing block using stereo frames fr(n) including two different sub-frames fa(n), fb(n) acquired at the same time instance from different positions, wherein a distance between the two positions is defined by the base line between two lens systems of the binocular optics.

A stereo matching block 267 computes sparse stereo correspondences ssc(n) between the frames fa(n), fb(n) captured at the same time instances. The stereo matching block 267 is a modified version of the temporal matching block 263, wherein the modification exploits the constraints inherent in a stereo camera setup as regards the epipolar lines and the stereo constraint. The sparse stereo correspondences ssc(n) may also be in the pose calculation block 264.

A stereo dense correspondences block 277 may compute the dense stereo correspondences dsc(n) between the stereo frames fr1(n) and fr2(n) captured at the same time instants n and may also be a modified version of the temporal dense correspondences block 274, wherein the stereo dense correspondences block 277 uses the sparse stereo correspondences ssc(n).

In the stereo approach, the temporal dense correspondences block 274 may remove outliers from the stereo dense estimation and may improve the triangulation concatenating the stereo estimation in an iterative fashion. According to another embodiment the temporal dense correspondences block 274 may be omitted.

In both the temporal matching setup and the stereo matching setup, the loops formed by reusing the previously obtained point cloud for estimating the dense correspondences, for carrying out an iterative triangulation and for updating position and pose information reduces the computational load in the system and improves reconstruction quality. By contrast, state of the art techniques for simultaneous pose estimation and dense point cloud reconstruction use global optimization methods merging information from all captured frames or at least from a sub-set of them and are therefore typically not suitable for real-time applications or when the size of the working memory is limited. Other known iterative approaches extract a set of salient points and apply a global optimization over a set of selected temporal key frames. A resulting 3D representation therefore results in a sparse point cloud of tracked salient image features, e.g., when the hardware has only limited resources available such as in mobile phones and tablets.

According to an embodiment, the triangulation block carries out an iterative triangulation method based on a ray accumulator sequentially updated with new depth information contained in the newly captured frame fr(n). As described above, feature matching as well as pose and position calculation provides information about the camera position and orientation relative to the object of interest. Disparity estimation then measures dense pixel correspondences between sequential and stereo images. Given the camera position and the disparity correspondences, each 3D image point can be interpreted as a ray in space, wherein the ray starts from a focal point and points to the 3D image point. The ray information may be temporarily saved in a ray buffer. The iterative triangulation method according to the present embodiment permanently updates the depth information contained in the ray buffer with newly captured monoscopic frames or stereo frames and finally determines the 3D coordinates of a dense point cloud.

Triangulation may be formulated as a least square minimization problem, wherein the triangulation concerns the salient image points and a single salient image point has known correspondences over N captured images. The N images may include both spatial images from a stereo frame capture and temporal images. From the previous processing steps, the pose of the camera at a certain position i at which image i is taken is estimated, wherein the pose information includes the camera pose given by a coordinate vector $p_i$ and the orientation of the camera given by a rotation matrix $R_i$.

With the coordinate of a salient point in the image i given by the direction cosines $u_i$ and $v_i$, each point in an image spans a ray vector $\eta_i = \lambda_i [u_i, v_i, 1]$ with $\lambda_i$ being the depth of the 3D point with respect to the coordinate system of the camera at position i. By transforming the ray into the world coordinate system, the projection equation of the camera rays is given by the camera position plus the ray of the salient image point rotated by the camera direction, $$x = p_i + \lambda_i R_i^T \eta_i$$

The triangulation determines the 3D point, such that the geometric distance between the point x and all rays with known image correspondence is minimized. The objective function becomes the accumulated geometric distance over all image correspondences as given in equation (1):

$$F(x) = \sum_i (x - p_i - \lambda_i R_i^T \eta_i)^2 \qquad (1)$$

In equation (1)—to determine the point x, the image coordinates must be known for all correspondences. The optimization function can be formulated as a recursive least square procedure for the minimum distance criterion equation (2) gives the variable for the depth $\lambda_i$:

$$\lambda_i = \frac{1}{|\eta_i|^2} \eta_i^T R_i (x - p_i) \qquad (2)$$

By substituting the depth variable $\lambda_i$ in equation (1) with the expression in equation (2), the "objective" function F(x) becomes of the quadratic form of equation (3):

$$F(x) = \sum_i (x - p_i)^T R_i^T (I - \eta_i \eta_i^T) R_i (x - p_i) \qquad (3)$$

In matrix notation using homogeneous coordinates, a quadratic form $Q_i$ may be defined that is represented by a 4×4 coefficient matrix given in equation (4):

$$Q_i = \begin{bmatrix} R_i & -R_i p_i \\ 0 & 1 \end{bmatrix}^T \begin{bmatrix} I - \eta_i \eta_i^T & 0 \\ 0 & 1 \end{bmatrix} \begin{bmatrix} R_i & -R_i p_i \\ 0 & 1 \end{bmatrix} \qquad (4)$$

Using the quadratic notation, equation (5) gives the cumulative distance objective:

$$F(x) = [x^T \ 1] \left[ \sum_i Q_i \right] \begin{bmatrix} x \\ 1 \end{bmatrix} \qquad (5)$$

Each quadratic form expresses the distance of a point x to a ray spanned by camera rotation $R_i$ and position $p_i$. By summation of the coefficients of the quadric one obtains an accumulated distance function. It is therefore not necessary to store the image coordinates for each image correspondence. Instead, one computes the quadratic coefficient matrix. Each quadric contains all necessary information about the shape and location of a ray in space. From the arithmetic sum of all quadrics, one obtains the final ray intersection coordinate by solving the objective equation (5). Since for homogeneous 3D coordinates the quadratic form is a symmetric matrix with a size of 4×4 coefficients, the number of non-redundant coefficients is 10. If only the triangulated coordinate is of interest, and the accumulated geometric error is of no interest it may be sufficient to use only 9 coefficients. In its recursive formulation, the triangulation buffer maintains a set of quadrics $Q_{sum}(i)$, which is updated by computing the running sum $Q_{sum}(i) = Q_{sum}(i-1) + Q(i)$ for each image correspondence either in temporal or spatial direction.

Instead of minimizing the geometric error another embodiment optimizes another error criterion, e.g., the reprojection error, wherein the geometric quadratic error function may be replaced by a tailor expansion of the respective error criterion.

Alternative recursive least-squares formulations, such as Kalman or Information filter may result in a different representation of the quadric above. For example, the above matrix in equation (5) may be interpreted in terms of a 3×3 covariance matrix, a 3 coefficient coordinate mean and an accumulated geometric error.

The statistical description of points in space may be used to check for outliers before adding them to the ray buffer. For example, if a new image correspondence results in a significant increase in terms of the error function, the image may be rejected for further consideration by means of robust statistics.

Above coefficients may be postprocessed by image processing means. For example, applying filtering operations applied to the coefficients, e.g., convolution filters or infilling algorithms to remove holes may smoothen a surface of the object of interest.

The quadric coefficients may be used for masking operations, to detect points of high reliability, such as detecting and masking points with high geometric accuracy or well-conditioned error shape.

The quadric representation may be used for advanced point cloud visualization. Since each recovered 3D point has a shape associated with it, this information may be used for realistic surface visualization using surfels In other words, with the camera position described by $p_i$ and the camera orientation described by $R_i$ for an image with index i and a ray direction vector $\eta_i=[u_i,v_i,1]$ formed by corresponding image points $(u_i,v_i)$ the iterative triangulation searches a point x with a minimum distance to all rays from all camera directions i according to equation (1).

Figure 8A:
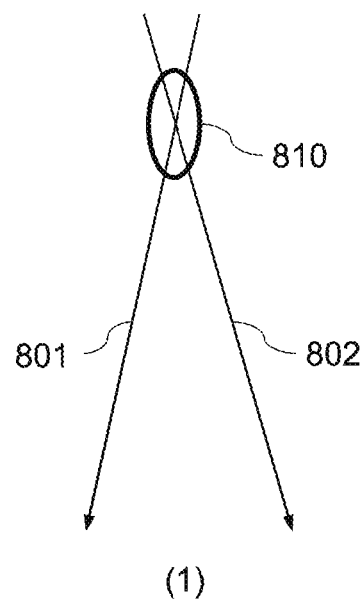
FIG. 8A is a schematic diagram illustrating a first ray intersection for discussing background of an iterative triangulation method according to a further embodiment.

FIG. 8A shows a first ray intersection 810 of two rays 801, 802 to image points from two stereoscopic sub-frames captured from different positions at the same time instance. The ray intersections can be described as an ellipse in space or quadrics. Quadrics describe the distance to a point, ray or plane by a bilinear, quadratic function and in deliver information on both the type and place of a ray intersection between rays an error shape of the ray intersection without elaborate computational effort. With a sufficient number of ray correspondences, the iterative triangulation method provides statistical information about a distance error and shape of the error distribution.

Figure 8B:
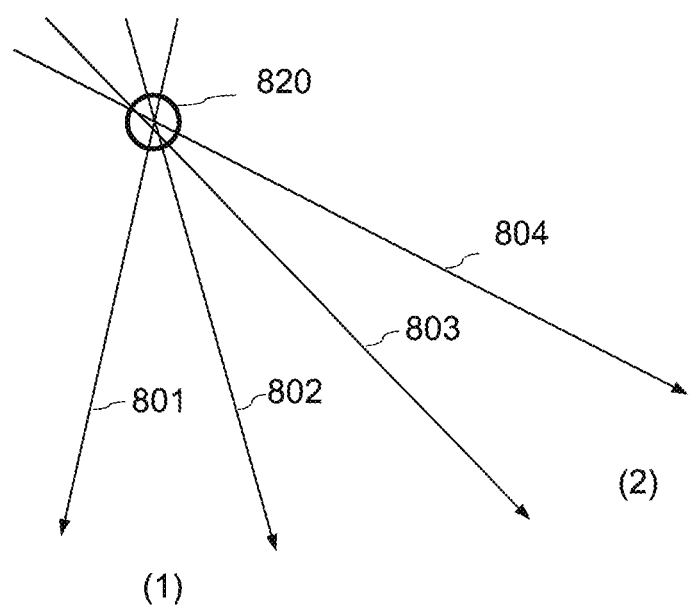
FIG. 8B is a schematic diagram illustrating a second ray intersection for discussing background of an iterative triangulation method according to a further embodiment.

FIG. 8B shows a second ray intersection 820 of the two rays 801, 802 of FIG. 8A and two further rays 803, 804 to corresponding image points of another frame captured at another time instance. The second ray intersection 820 is smaller than the first ray intersection 810. Hence with each new frame, the area of the ray intersection can be reduced and the depth information gets more reliable.

Figure 8C:
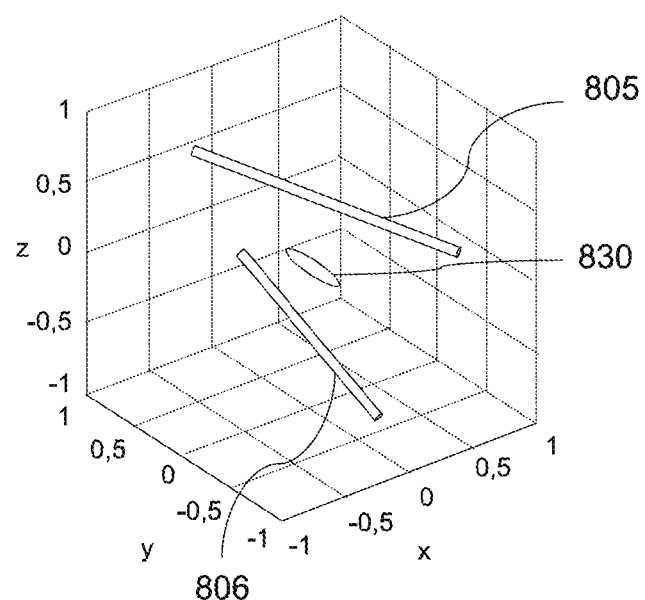
FIG. 8C is a schematic diagram illustrating a third ray intersection for discussing background of an iterative triangulation method according to a further embodiment.

FIG. 8C illustrates the triangulation problem in case of two rays 805, 806 with narrow angle. The Intersection 830 of the two rays 805, 806 has an elongated shape.

The optimization problem of equation (1) is solved by a linear system, which can be iteratively updated. The updated dense point cloud dpcld(n) may be obtained by solving a linear equation for each point.

The iterative triangulation method tracks the spatial points in the ray buffer. A re-meshing step transforms the spatial points into a discrete coordinate grid spanned by the image grid formed by the current view. The ray buffer therefore tracks only those image points visible in the current camera view. If a previously observed image point is occluded or moves out of the field of view, it is no longer available for further processing.

For each image point the rays temporarily stored in the ray buffer deliver a quadric and a distance which are re-meshed with each new frame. In this way the ray buffer accumulates depth information. The ray buffer has a regular, not-changing memory representation and is therefore highly suitable to be kept in the memory of a GPU (graphical processor unit). Further the ray buffer can be processed in the GPU in an economic way and can also be used for cleaning up noisy depth maps at low computational complexity.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the disclosure, as well as other claims. The disclosure, including any readily discernible variants of the teachings herein, defines, in part, the scope of the foregoing claim terminology.

The present technology can also be configured as described below:

(1) An electronic system, including
circuitry (910) configured to
obtain a sequence of frames of an object (990) under different viewing angles; and
generate, for a first time instance, a point cloud descriptive for an external surface of the object on basis of (i) a point cloud obtained for a second time instance preceding the first time instance and (ii) disparity information concerning a frame captured at the first time instance.

(2) The electronic system according to (1), wherein
the disparity information concerns the frame captured at the first time instance and a frame captured at a preceding time instance.

(3) The electronic system according to any of (1) and (2), wherein
the frame captured at the first time instance includes one or more sub-frames captured at the first time instance from different positions.

(4) The electronic system according to any of (1) to (3), further including
a display unit (300) adapted to display a picture imaging a 3D representation of the dense point cloud obtained for the first time instance.

(5) The electronic system according to (4), wherein
the circuitry (910) and the display unit (300) are adapted to update the picture imaged on the display unit (300) while capturing the sequence of frames.

(6) The electronic system according to any of (1) to (5), wherein
the circuitry (910) is further configured to identify sparse correspondences between the first frame and a preceding frame for sparse salient image points in the first and the preceding frames.

(7) The electronic system according to (6), wherein
the circuitry (910) is further configured to estimate dense correspondences by an iterative method using the preceding point cloud and the actual sparse correspondences as starting value.

(8) The electronic system according to (7), wherein
the circuitry (910) is further configured to calculate an actual pose of the image capturing unit (100) relative to the object (990) on the basis of the dense correspondences dc(n) for the first frame fr(n) by using iterative methods.

(9) The electronic system according to any of (1) to (8), wherein the circuitry (910) is further configured to update depth information contained in the preceding point cloud by using information contained in the first frame.

(10) The electronic system according to (9), wherein the circuitry (910) uses a ray accumulator configured to temporarily store a ten coefficient vector.

(11) The electronic system according to any of (1) to (10), wherein the circuitry (910) includes an image capturing unit (100) adapted to obtain a sequence of frames of an object (990) under different viewing angles; and a processing unit) adapted to generate, for a first time instance, a point cloud descriptive for an external surface of the object on basis of (i) a point cloud obtained for a second time instance preceding the first time instance and (ii) disparity information concerning a frame captured at the first time instance.

(12) A 3D reconstruction method, including capturing a sequence of frames of an object (990) under different viewing angles at consecutive time instances; and generating, for a first time instance, a point cloud descriptive for an external surface of the object on basis of (i) a point cloud obtained for second time instance preceding the first time instance and (ii) disparity information concerning a frame captured at the first time instance.

(13) The 3D reconstruction method according to (12), wherein the disparity information concerns the frame captured at the first time instance and a frame captured at a preceding time instance.

(14) The 3D reconstruction method according to any of (12) and (13), wherein the frame captured at the first time instance includes one or more sub-frames captured at the first time instance from different positions.

(15) The 3D reconstruction method according to any of (12) to (14), further including displaying a picture imaging a 3D representation of the dense point cloud obtained for the first time instance.

(16) The 3D reconstruction method according to (15), wherein the displayed pictures are imaged on the display unit (300) while capturing the sequence of frames.

(17) An iterative triangulation method, including converting a 3D information for image points in frames captured from different positions into a ray representation containing direction information; and updating the ray representation with each new captured frame.

(18) The iterative triangulation method according to (17), wherein the ray representation is formally a quadric.

The invention claimed is:

1. An electronic system, comprising
circuitry configured to
obtain a sequence of frames of an object under different viewing angles,
process the sequence of frames, wherein the circuitry for processing the sequence of frames is further configured to
receive preconditioned frames,
for each preconditioned frame, extract salient image points, wherein the salient image points identify small image areas of high contrast,
reduce a total number of salient image points by selecting only a predetermined number of stable salient image points, and
generate, for a first time instance, a point cloud descriptive for an external surface of the object based on (i) a point cloud obtained for a second time instance preceding the first time instance and (ii) disparity information concerning a frame captured at the first time instance,
display a 3D representation of the point cloud generated for the first time instance, and
update the displayed 3D representation while obtaining the sequence of frames.

2. The electronic system according to claim 1, wherein the disparity information concerns the frame captured at the first time instance and a frame captured at the second time instance.

3. The electronic system according to claim 1, wherein the frame captured at the first time instance includes one or more sub-frames captured at the first time instance from different positions.

4. The electronic system according to claim 1, wherein the circuitry is further configured to identify sparse correspondences between the first frame and a preceding frame for sparse salient image points in the first and the preceding frame, the preceding frame corresponding to a frame captured at the second time instance.

5. The electronic system according to claim 4, wherein the circuitry is further configured to calculate dense correspondences between two consecutive frames, a starting value being obtained by the preceding point cloud updated by information obtained about the identified sparse correspondences.

6. The electronic system according to claim 5, wherein the circuitry is further configured to calculate an actual pose of an image capturing unit relative to the object based on the dense correspondences dc(n) for the first frame fr(n) by using iterative methods.

7. The electronic system according to claim 1, wherein the circuitry is further configured to update depth information contained in the point cloud obtained at the second time instance by using information contained in the first frame.

8. The electronic system according to claim 7, wherein the circuitry uses a ray accumulator configured to temporarily store a ten coefficient vector.

9. The electronic system according to claim 1, wherein the circuitry comprises,
an image capturing unit adapted to obtain the sequence of frames of the object under different viewing angles; and
a processing unit adapted to generate, for the first time instance, the point cloud descriptive for the external surface of the object based on (i) the point cloud obtained for the second time instance preceding the first time instance and (ii) disparity information concerning the frame captured at the first time instance.

10. A 3D reconstruction method, comprising
capturing a sequence of frames of an object under different viewing angles at consecutive time instances;
processing the sequence of frames, wherein processing the sequence of frames includes
receiving preconditioned frames;

for each preconditioned frame, extracting salient image points, wherein the salient image points identify small image areas of high contrast:
reducing a total number of salient image points by selecting only a predetermined number of stable salient image points; and
generating, for a first time instance, a point cloud descriptive for an external surface of the object based on (i) a point cloud obtained for second time instance preceding the first time instance and (ii) disparity information concerning a frame captured at the first time instance;
displaying a 3D representation of the point cloud generated for the first time instance; and
updating the displayed 3D representation while capturing the sequence of frames.

11. The 3D reconstruction method according to claim 10, wherein
the disparity information concerns the frame captured at the first time instance and a frame captured at the second time instance.

12. The 3D reconstruction method according to claim 10, wherein
the frame captured at the first time instance includes one or more sub-frames captured at the first time instance from different positions.

\* \* \* \* \*